United States Patent
Eslami

(10) Patent No.: US 9,591,330 B2
(45) Date of Patent: Mar. 7, 2017

(54) IMAGE PROCESSING SYSTEM WITH BINARY ADAPTIVE GOLOMB CODING AND METHOD OF OPERATION THEREOF

(71) Applicant: Sony Corporation, Tokyo (JP)

(72) Inventor: Ramin Eslami, Milpitas, CA (US)

(73) Assignee: Sony Corporation, Tokyo (JP)

(*) Notice: Subject to any disclaimer, the term of this patent is extended or adjusted under 35 U.S.C. 154(b) by 354 days.

(21) Appl. No.: 14/525,657

(22) Filed: Oct. 28, 2014

(65) Prior Publication Data
US 2016/0119647 A1    Apr. 28, 2016

(51) Int. Cl.
| | |
|---|---|
| H04N 19/635 | (2014.01) |
| H04N 19/122 | (2014.01) |
| H04N 19/625 | (2014.01) |
| H04N 19/94 | (2014.01) |
| H04N 19/21 | (2014.01) |
| H04N 19/29 | (2014.01) |
| H04N 19/13 | (2014.01) |
| H04N 19/64 | (2014.01) |
| H04N 19/463 | (2014.01) |
| H04N 19/91 | (2014.01) |
| H04N 19/93 | (2014.01) |

(52) U.S. Cl.
CPC ......... *H04N 19/635* (2014.11); *H04N 19/122* (2014.11); *H04N 19/13* (2014.11); *H04N 19/21* (2014.11); *H04N 19/29* (2014.11); *H04N 19/463* (2014.11); *H04N 19/625* (2014.11); *H04N 19/647* (2014.11); *H04N 19/91* (2014.11); *H04N 19/93* (2014.11); *H04N 19/94* (2014.11)

(58) Field of Classification Search
CPC .. H04N 19/635; H04N 19/122; H04N 19/625; H04N 19/13; H04N 19/21; H04N 19/29; H04N 19/94

USPC .................................................. 375/240.19
See application file for complete search history.

(56) References Cited

U.S. PATENT DOCUMENTS

| | | | |
|---|---|---|---|
| 6,154,493 A | 11/2000 | Acharya et al. | |
| 6,272,180 B1 * | 8/2001 | Lei | H04N 19/63 375/240.16 |
| 6,356,665 B1 | 3/2002 | Lei et al. | |

(Continued)

FOREIGN PATENT DOCUMENTS

WO    WO-0049571 A2    8/2000

OTHER PUBLICATIONS

U.S. Appl. No. 14/525,364, filed Oct. 28, 2014, Eslami.

(Continued)

*Primary Examiner* — Zhihan Zhou
(74) *Attorney, Agent, or Firm* — Haverstock & Owens LLP

(57) ABSTRACT

A system and method of operation of an image processing system includes: a pre-processing module for receiving a raw image block of a source image from an imaging device; a transform module for forming a coefficient block by performing a transform operation on the raw image block, and the transform operation including a wavelet transform or a discrete cosine transform; and an encoding module wherein the encoding module is for calculating a coefficient significance vector, a partition significance vector, a run-length coded value, and a Golomb coded value for a portion of a significant partition, and forming an encoded block in an image bitstream having the run-length coded value and the Golomb coded value, and the encoded block.

20 Claims, 12 Drawing Sheets

(56) References Cited

U.S. PATENT DOCUMENTS

| | | | |
|---|---|---|---|
| 6,542,641 B1* | 4/2003 | Andrew | G06T 9/40 382/233 |
| 6,546,143 B1 | 4/2003 | Taubman et al. | |
| 6,549,666 B1 | 4/2003 | Schwartz | |
| 6,801,665 B1 | 10/2004 | Atsumi et al. | |
| 6,865,291 B1 | 3/2005 | Zador | |
| 6,965,700 B2 | 11/2005 | Pearlman et al. | |
| 7,006,697 B1 | 2/2006 | Gormish et al. | |
| 7,120,307 B2 | 10/2006 | Malvar | |
| 7,142,722 B2 | 11/2006 | Fukuhara et al. | |
| 7,248,735 B2 | 7/2007 | Funakubo | |
| 7,308,402 B2 | 12/2007 | Zhou et al. | |
| 7,315,651 B2 | 1/2008 | Sakuyama et al. | |
| 7,376,279 B2 | 5/2008 | Dekel et al. | |
| 7,397,963 B2 | 7/2008 | Schwartz | |
| 7,412,102 B2 | 8/2008 | Srinivasan et al. | |
| 7,421,137 B2 | 9/2008 | Taubman | |
| 7,454,074 B2 | 11/2008 | Dekel et al. | |
| 7,492,955 B2 | 2/2009 | Zandi et al. | |
| 7,545,988 B2 | 6/2009 | Meeker | |
| 7,574,056 B2 | 8/2009 | Funakubo et al. | |
| 7,623,577 B2 | 11/2009 | Kim et al. | |
| 7,634,145 B2 | 12/2009 | Keith et al. | |
| 7,656,561 B2 | 2/2010 | Molgaard et al. | |
| 7,949,044 B2 | 5/2011 | Winger et al. | |
| 8,265,334 B2 | 9/2012 | Yoo et al. | |
| 8,306,340 B2 | 11/2012 | Ceperkovic et al. | |
| 8,351,693 B2 | 1/2013 | Hayashi | |
| 8,401,082 B2 | 3/2013 | Ye et al. | |
| 8,428,379 B2 | 4/2013 | Rane et al. | |
| 8,446,947 B2 | 5/2013 | Yu et al. | |
| 8,588,536 B2 | 11/2013 | Dikbas et al. | |
| 8,861,879 B2 | 10/2014 | Park et al. | |
| 2001/0024530 A1 | 9/2001 | Fukuhara et al. | |
| 2002/0003905 A1 | 1/2002 | Sato et al. | |
| 2002/0118759 A1 | 8/2002 | Enficiaud et al. | |
| 2003/0063809 A1 | 4/2003 | Andrew | |
| 2003/0123742 A1 | 7/2003 | Zhao et al. | |
| 2003/0190042 A1 | 10/2003 | Tagashira et al. | |
| 2005/0131660 A1 | 6/2005 | Yadegar et al. | |
| 2006/0034525 A1 | 2/2006 | Sakai | |
| 2006/0159355 A1* | 7/2006 | Mizuno | H04N 19/147 382/239 |
| 2008/0253463 A1 | 10/2008 | Lin et al. | |
| 2010/0046628 A1 | 2/2010 | Bhaskaran et al. | |
| 2010/0085224 A1 | 4/2010 | Monro | |
| 2011/0134995 A1* | 6/2011 | An | H04N 19/176 375/240.02 |
| 2011/0229047 A1 | 9/2011 | Shimauchi et al. | |
| 2011/0292247 A1 | 12/2011 | Gharavi-Alkhansari et al. | |
| 2012/0200669 A1 | 8/2012 | Lai et al. | |
| 2012/0307904 A1 | 12/2012 | Yi et al. | |
| 2014/0169693 A1 | 6/2014 | Kuo et al. | |

OTHER PUBLICATIONS

U.S. Appl. No. 14/525,474, filed Oct. 28, 2014, Eslami.
U.S. Appl. No. 14/525,524, filed Oct. 28, 2014, Eslami.
U.S. Appl. No. 14/525,556, filed Oct. 28, 2014, Eslami.
U.S. Appl. No. 14/525,611, filed Oct. 28, 2014, Eslami.
U.S. Appl. No. 14/526,120, filed Oct. 28, 2014, Eslami.
Pearlman et al., Efficient, Low-Complexity Image Coding with a Set-Partitioning Embedded Block Coder, IEEE Transactions on Circuits and Systems for Video Technology, Nov. 2004, pp. 1219-1235, vol. 14, No. 11, IEEE.

* cited by examiner

FIG. 2

| X | 100 | 100 | 101 | 110 | 101 | 103 | 105 | 106 | 105 | 104 | 103 | 102 | 103 | 104 | 103 | 104 | 104 | 105 | 104 | 102 | 100 | 96 | 89 | 80 | 72 | 69 | 68 | 67 | 66 | 65 | 65 |
|---|---|---|---|---|---|---|---|---|---|---|---|---|---|---|---|---|---|---|---|---|---|---|---|---|---|---|---|---|---|---|---|
| Y | 37 | 40 | 44 | 16 | -1 | -2 | 12 | -15 | 1 | 2 | -1 | 0 | 2 | 6 | -4 | -2 | 0 | 0 | 1 | 0 | -1 | 1 | 0 | 1 | 1 | -2 | 0 | 0 | 0 |
| INDEX | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 |

206: indices 1–4
208: indices 5–8
210: indices 9–16
212: indices 17–32

| y | 37 | 40 | 44 | 16 | -1 | -2 | 12 | -15 | 1 | 2 | -1 | 0 | 2 | 6 | -4 | -2 | 0 | 0 | 1 | 0 | -1 | 1 | 0 | 1 | 1 | -2 | 0 | 0 | 0 |
|---|---|---|---|---|---|---|---|---|---|---|---|---|---|---|---|---|---|---|---|---|---|---|---|---|---|---|---|---|---|---|---|
| index | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 |
| n=6 | 1 | 1 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| n=5 | 0 | 0 | 0 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| n=4 | 0 | 1 | 1 | 0 | 0 | 0 | 1 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| n=3 | 1 | 0 | 1 | 0 | 0 | 0 | 1 | 0 | 0 | 0 | 0 | 0 | 0 | 1 | 1 | 0 | 0 | 0 | 0 | 0 | 0 | 0 | 0 | 0 | 0 | 0 | 0 | 0 | 1 | 0 | 0 | 0 |
| n=2 | 0 | 0 | 0 | 0 | 0 | 0 | 1 | 1 | 0 | 0 | 0 | 0 | 0 | 1 | 0 | 0 | 0 | 0 | 0 | 0 | 0 | 0 | 0 | 0 | 0 | 0 | 0 | 0 | 0 | 0 | 0 | 0 |
| n=1 | 1 | 0 | 0 | 0 | 1 | 1 | 1 | 1 | 1 | 1 | 0 | 0 | 0 | 0 | 0 | 0 | 0 | 0 | 0 | 0 | 0 | 1 | 0 | 1 | 0 | 1 | 1 | 0 | 0 | 0 | 0 | 0 |

116 → y
308 → index
304 → n=6
310 → n=4
302 → n=3
312 → n=2
306 → n=1

| index | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 |
|---|---|---|---|---|---|---|---|---|---|---|---|---|---|---|---|---|---|---|---|---|---|---|---|---|---|---|---|---|---|---|---|---|
| y[n] | 1 | 0 | 0 | 1 | 1 | 1 | 0 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| CSV | 2 | 1 | 2 | 2 | 1 | 2 | 1 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| New State of CSV | 2 | 1 | 2 | 3 | 2 | 3 | 2 | 3 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |

FIG. 6

| Index i | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 |
|---|---|---|---|---|---|---|---|---|---|---|---|---|---|---|---|---|---|---|---|---|---|---|---|---|---|---|---|---|---|---|---|---|
| y[n] | 0 | 0 | 0 | 0 | 0 | 0 | 0 | 1 | 0 | 0 | 0 | 0 | 0 | 0 | 0 | 0 | 0 | 0 | 0 | 0 | 0 | 0 | 0 | 0 | 0 | 0 | 0 | 0 | 1 | 0 | 0 | 0 |
| PSV | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 1 | 0 | 0 | 0 |
| New State of PSV | 0 | 0 | 0 | 0 | 0 | 0 | 0 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| Partition J | 1 | | | | 2 | | | | | 3 | | | | 4 | | | | 5 | | | | 6 | | | | 7 | | | | 8 | | |

702

| 704 LUMA | |
|---|---|
| Partition bits | Code |
| 0001 | 100 |
| 0010 | 101 |
| 0100 | 110 |
| 1000 | 111 |
| 0011 | 0100 |
| 0110 | 0101 |
| 1001 | 0110 |
| 1100 | 0111 |
| 0101 | 00100 |
| 0111 | 00101 |
| 1010 | 00110 |
| 1110 | 00111 |
| 1011 | 000100 |
| 1101 | 000101 |
| 1111 | 000110 |

710

| 712 CHROMA | |
|---|---|
| Partition bits | Code |
| 0001 | 100 |
| 0010 | 101 |
| 0100 | 110 |
| 1000 | 111 |
| 0011 | 0100 |
| 0101 | 0101 |
| 1010 | 0110 |
| 1100 | 0111 |
| 0110 | 00100 |
| 0111 | 00101 |
| 1001 | 00110 |
| 1011 | 00111 |
| 1101 | 000100 |
| 1110 | 000101 |
| 1111 | 000110 |

716

706  708  714

PRE-DETERMINED IMAGE SET 718

IMAGE PROCESSING SYSTEM WITH BINARY ADAPTIVE GOLOMB CODING AND METHOD OF OPERATION THEREOF

CROSS-REFERENCE TO RELATED APPLICATION(S)

The present application contains subject matter related to a concurrently filed U.S. Patent Application by Ramin Eslami entitled "IMAGE PROCESSING SYSTEM WITH BITSTREAM REDUCTION AND METHOD OF OPERATION THEREOF". The related application is assigned to Sony Corporation and is identified as U.S. Patent Application Ser. No. 14/525,364, filed Oct. 28,2014 (now U.S. Pat. No. 9,357,237). The subject matter thereof is incorporated herein by reference thereto.

The present application contains subject matter related to a concurrently filed U.S. Patent Application by Ramin Eslami entitled "IMAGE PROCESSING SYSTEM WITH BINARY DECOMPOSITION AND METHOD OF OPERATION THEREOF". The related application is assigned to Sony Corporation and is identified as U.S. Patent Application Ser. No. 14/525,474, filed Oct. 28,2014 (now U.S. Pat. No. 9,357,232). The subject matter thereof is incorporated herein by reference thereto.

The present application contains subject matter related to a concurrently filed U.S. Patent Application by Ramin Eslami entitled "IMAGE PROCESSING SYSTEM WITH ARTIFACT REDUCTION MECHANISM AND METHOD OF OPERATION THEREOF". The related application is assigned to Sony Corporation and is identified as U.S. Patent Application No. 14/525,524, filed Oct. 28, 2014 (now U.S. Pat. No. 9,294,782). The subject matter thereof is incorporated herein by reference thereto.

The present application contains subject matter related to a concurrently filed U.S. Patent Application by Ramin Eslami entitled "IMAGE PROCESSING SYSTEM WITH CODING MODE AND METHOD OF OPERATION THEREOF". The related application is assigned to Sony Corporation and is identified as U.S. Patent Application No. 14/525,556, filed Oct. 28, 2014. The subject matter thereof is incorporated herein by reference thereto.

The present application contains subject matter related to a concurrently filed U.S. Patent Application by Ramin Eslami entitled "IMAGE PROCESSING SYSTEM WITH CONDITIONAL CODING AND METHOD OF OPERATION THEREOF". The related application is assigned to Sony Corporation and is identified as U.S. Patent Application No. 14/525,611, filed Oct. 28, 2014. The subject matter thereof is incorporated herein by reference thereto.

The present application contains subject matter related to a concurrently filed U.S. Patent Application by Ramin Eslami entitled "IMAGE PROCESSING SYSTEM WITH JOINT ENCODING AND METHOD OF OPERATION THEREOF". The related application is assigned to Sony Corporation and is identified as U.S. Patent Application No. 14/526,120, filed Oct. 28,2014. The subject matter thereof is incorporated herein by reference thereto.

TECHNICAL FIELD

The present invention relates generally to an image processing system, and more particularly to an image processing system with binary adaptive Golomb coding.

BACKGROUND ART

Modern consumer and industrial electronics, especially devices with a graphical imaging capability, such as cameras, televisions, projectors, cellular phones, and combination devices, are providing increasing levels of functionality to support modern life which require capturing and managing digital image information. Larger image format sizes and recording speeds require ever larger amounts of information to be digitally stored on digital media to capture images and video recordings. Research and development in the existing technologies can take a myriad of different directions.

As users become more empowered with the growth of imaging devices, new and old paradigms begin to take advantage of this new device space. There are many technological solutions to take advantage of this new imaging opportunity. One existing approach is to capture and display images on consumer, industrial, and mobile electronics such as digital cameras, smart phones with imaging capability, digital projectors, televisions, monitors, gaming systems, video cameras, or a combination devices.

Image capture and display systems have been incorporated in cameras, phones, projectors, televisions, notebooks, and other portable products. Today, these systems aid users by capturing and displaying available relevant information, such as images, graphics, text, or videos. The capture and display of digital images provides invaluable relevant information.

However, capturing, managing, and displaying information in digital images has become a paramount concern for the consumer. Mobile systems must store larger amounts of digital image information in smaller physical storage spaces. Limiting the capture of digital images decreases the benefit of using the tools.

Thus, a need still remains for better image processing system to capture and display digital images. In view of the ever-increasing commercial competitive pressures, along with growing consumer expectations and the diminishing opportunities for meaningful product differentiation in the marketplace, it is increasingly critical that answers be found to these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

DISCLOSURE OF THE INVENTION

The embodiments of the present invention provide a method of operation of an image processing system, including: receiving a raw image block of a source image from an imaging device; forming a coefficient block by performing a transform operation on the raw image block, the transform operation including a wavelet transform or a discrete cosine transform; calculating a coefficient significance vector for a current bitplane of the coefficient block, the coefficient significance vector having a significant value set at each index position having a non-zero value at a higher bitplane; calculating a partition significance vector for the current bitplane of the coefficient block, the partition significance vector having the significant value for each wavelet partition having a non-zero value; calculating a run-length coded value for a portion of the partition significance vector; calculating a Golomb coded value for a portion of a significant partition; forming an encoded block having the run-length coded value and the Golomb coded value; and forming a bitstream having the encoded block.

The embodiments of the present invention provide an image processing system, including: a pre-processing module for receiving a raw image block of a source image from an imaging device; a transform module for forming a coefficient block by performing a transform operation on the raw image block, and the transform operation including a wavelet transform or a discrete cosine transform; and an encoding module wherein the encoding module is for: calculating a coefficient significance vector for a current bitplane of the coefficient block, the coefficient significance vector having a significant value set at each index position having a non-zero value at a higher bitplane, calculating a partition significance vector for the current bitplane of the coefficient block, the partition significance vector having the significant value for each wavelet partition having a non-zero value, calculating a run-length coded value for a portion of the partition significance vector, calculating a Golomb coded value for a portion of a significant partition, and forming an encoded block in an image bitstream, the encoded block having the run-length coded value and the Golomb coded value, and the encoded block.

Certain embodiments of the invention have other steps or elements in addition to or in place of those mentioned above. The steps or elements will become apparent to those skilled in the art from a reading of the following detailed description when taken with reference to the accompanying drawings.

BRIEF DESCRIPTION OF THE DRAWINGS

FIG. 2 is an example of the coefficient block.

FIG. 3 is an example of the coefficient blocks bitplanes.

FIG. 4 is a second example of the coefficient blocks bitplanes.

FIG. 5 is an example of a coefficient significance vector.

FIG. 6 is an example of a partition significance vector.

BEST MODE FOR CARRYING OUT THE INVENTION

Figure 1:
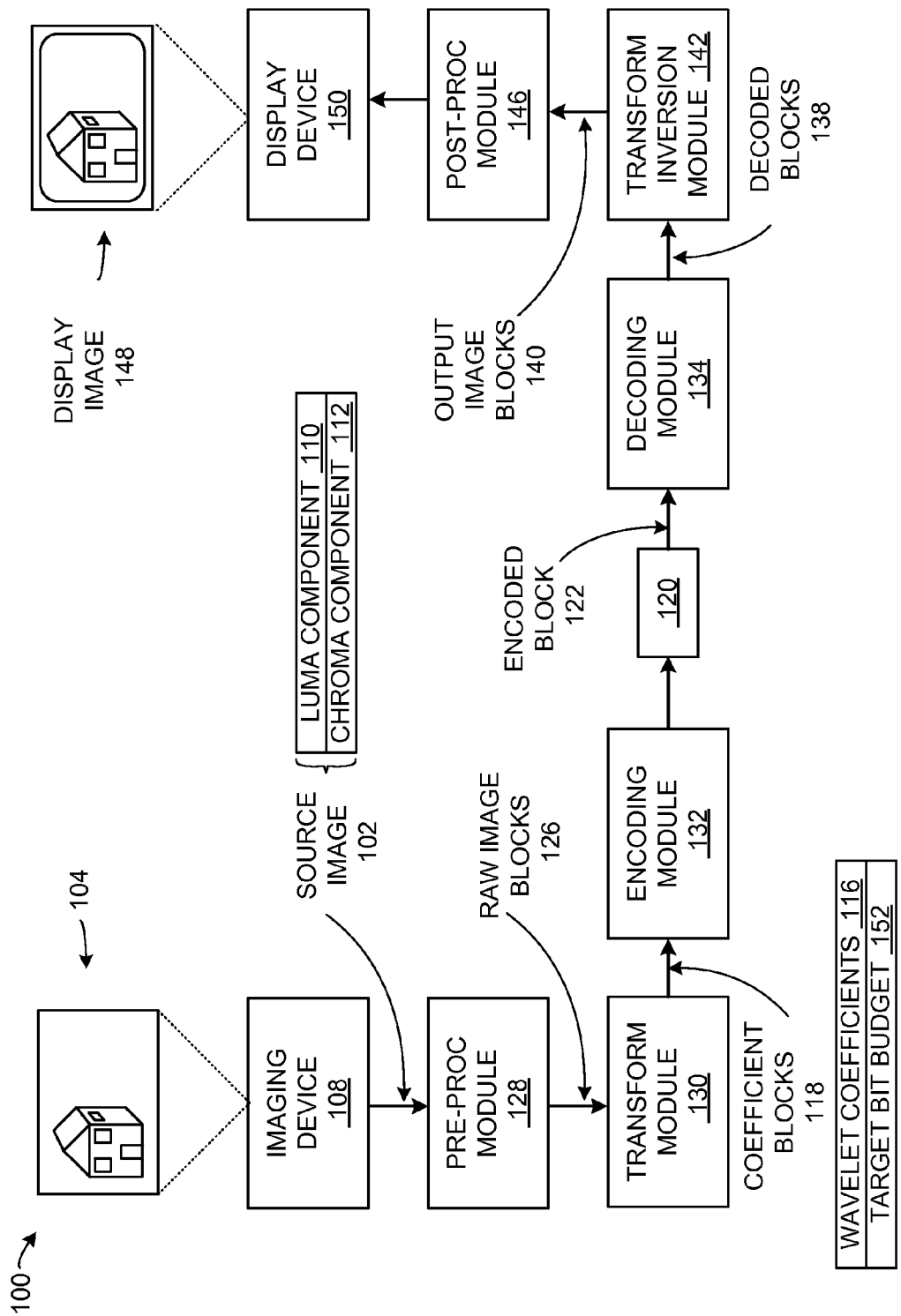
FIG. 1 is a block diagram of an image processing system in an embodiment of the present invention.

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail.

The drawings showing embodiments of the system are semi-diagrammatic and not to scale and, particularly, some of the dimensions are for the clarity of presentation and are shown exaggerated in the drawing FIGs. Similarly, although the views in the drawings for ease of description generally show similar orientations, this depiction in the FIGs. is arbitrary for the most part. Generally, the invention can be operated in any orientation.

The same numbers are used in all the drawing FIGs. to relate to the same elements. The embodiments have been numbered first embodiment, second embodiment, etc. as a matter of descriptive convenience and are not intended to have any other significance or provide limitations for the embodiments of the present invention.

The term "image" is defined as a pictorial representation of an object. An image can include a two-dimensional image, three-dimensional image, a video frame, a calculated file representation, an image from a camera, a video frame, or a combination thereof. For example, the image can be a machine readable digital file, a physical photograph, a digital photograph, a motion picture frame, a video frame, an x-ray image, a scanned image, or a combination thereof. The image can be formed by pixels arranged in a rectangular array. The image can include an x-axis along the direction of the rows and a y-axis along the direction of the columns.

The horizontal direction is the direction parallel to the x-axis of an image. The vertical direction is the direction parallel to the y-axis of an image. The diagonal direction is the direction non-parallel to the x-axis and non-parallel to the y-axis.

The term "module" referred to herein can include software, hardware, or a combination thereof. For example, the software can be machine code, firmware, embedded code, and application software. Also for example, the hardware can be circuitry, processor, calculator, integrated circuit, integrated circuit cores, or a combination thereof.

Referring now to FIG. 1, therein is shown a block diagram of an image processing system 100 in an embodiment of the present invention. The image processing system 100 can encode and decode image information.

An imaging device 108 can form a source image 102 from a scene 104. The imaging device 108 is a device for capturing image data to form the source image 102.

The source image 102 is a digital representation of the scene 104. The source image 102 can be a digital image. The source image can be formatted with a color model such as luminance-chroma (YUV), Red-Green-Blue (RGB), Cyan-Magenta-Yellow-Key (CMYK), or a similar color model.

For example, the source image 102 can be represented using the YUV color model. The source image 102 can have a luma component 110 and a chroma component 112, such as a first chroma component and a second chroma component.

A pre-processing module 128 can partition the source image 102 into raw image blocks 126 for easier processing. Each of the raw image blocks 126 can be extracted from the source image 102. The raw image blocks 126 form a subset of the source image 102. For example, the raw image blocks 126 can be a 1-dimensional 32×1 groups of pixels. The raw image blocks 126 can be extracted from the source image 102 in a non-sequential manner. The raw image blocks 126 of the source image 102 can be accessed and processed in a random access manner because each of the raw image blocks 126 is processed independently.

A transform module 130 can apply a transform to each of the raw image blocks 126. For example, the transform module 130 can perform a wavelet transform, such as a Daubechies 5/3 integer wavelet transform, on each of the raw image blocks 126 to calculate wavelet coefficients 116 to form coefficient blocks 118. The coefficient blocks 118 are represented in the binary format for the encoding process. In another example, the transform module 130 can perform a discrete cosine transform on the raw image blocks 126 to calculate the coefficient blocks 118.

An encoding module 132 can receive and encode the coefficient blocks 118 to form an encoded block 122 for a bitstream 120. The encoded block 122 is computationally modified data representing one of the coefficient blocks 118. The bitstream 120 is a digital representation of the coefficient blocks 118 of the source image 102. For example, the bitstream 120 can be an encoded version of the source image 102.

Encoding is defined as computationally modifying a representation of an image to a different form. For example, encoding can compress the coefficient blocks 118 into the encoded block 122 for inserting into the bitstream 120 to reduce the amount of data needed to transmit the bitstream 120.

The encoding module 132 can encode the source image 102 to form the encoded block 122 by compressing the coefficient blocks 118. For example, the bitstream 120 can be a bit sequence having the encoded block 122 and representing a compression of the source image 102.

The encoding module 132 can be implemented in a variety of ways. For example, the encoding module 132 can be implemented using hardware, software, or a combination thereof. For example, the encoding module 132 can be implemented with custom circuitry, a digital signal processor, microprocessor, integrated circuits, or a combination thereof.

The encoding process can be configured with a target bit budget 152. The target bit budget 152 is the number of bits allowed for the compressed version of the coefficient blocks 118. For example, if the target bit rate for transmission to the bitstream 120 is 4 bits per sample, then the target bit budget 152 can be 32 times 4 for 128 bits for a one color block of size 32×1. If the coefficient blocks 118 have an 8-bit depth, then this is equivalent to a 50% compression ratio.

In an illustrative example, the bitstream 120 can be a serial bitstream sent from the encoding module 132 to a decoding module 134. In another illustrative example, the bitstream 120 can be a data file stored on a storage device and retrieved for use by the decoding module 134.

In an illustrative example, the bitstream 120 can be a serial bitstream sent from the encoding module 132 to a further module. Alternatively, the bitstream 120 can be stored as a digital file on a storage device for decoding at a later time.

The decoding module 134 can receive and decode the bitstream 120 to form decoded blocks 138. The decoded blocks 138 are a representation of the coefficient blocks 118 within a possible low error. The decoded wavelet coefficients are not exactly the same as the original wavelet coefficients since the encoding process is not completely lossless. However, the amount of error is low enough to decode without visible artifacts.

The decoding module 134 can extract the encoded block 122 from the bitstream 120 and form the decoded block 138. Decoding is defined as computationally modifying the bitstream 120 to form the decoded block 138.

The decoding module 134 can be implemented in a variety of ways. For example, the decoding module 134 can be implemented using hardware, software, or a combination thereof. For example, the decoding module 134 can be implemented with custom circuitry, a digital signal processor, microprocessor, integrated circuits, or a combination thereof.

A transform inversion module 142 can receive the decoded blocks 138 and apply an inverse wavelet transform operation to form output image blocks 140. The inverse wavelet transform operation can convert the wavelet coefficients 116 back into output image blocks 140. The output image blocks 140 are representations of the raw image blocks 126 of the source image 102 after the wavelet transformation, coding, decoding, and inverse wavelet transformation.

A post-processing module 146 can receive the output image blocks 140 from the transform inversion module 142 for assembly into a display image 148, storage in a local memory, or further processing. The display image 148 is a representation of the source image 102. For example, the post-processing module 146 can receive the output image blocks 140, such as 32×1 groups of pixels, and combine them in order to form the display image 148.

A display device 150 can receive the display image 148 from the post-processing module 146 for presentation on a display device. For example, the display device 150 can present the display image 148 on a monitor, a flat panel display, a television screen, a camera display, a smart phone, or a similar display device.

The modules can be implemented in hardware or software. For example, the modules can be implemented as electronic circuitry, such as integrated circuits, discrete circuit, or a combination thereof. In another example, the modules can be implemented in software, such as software running on a dedicated processor, a microprocessor, coprocessor, or a combination thereof.

It has been discovered that accessing the raw image blocks 126 of the source image 102 in a random access manner increases flexibility and computational performance. Because each of the raw image blocks 126 is coded independently of other blocks, there are no limitations on data access and computational parallelism.

Figure 1A:
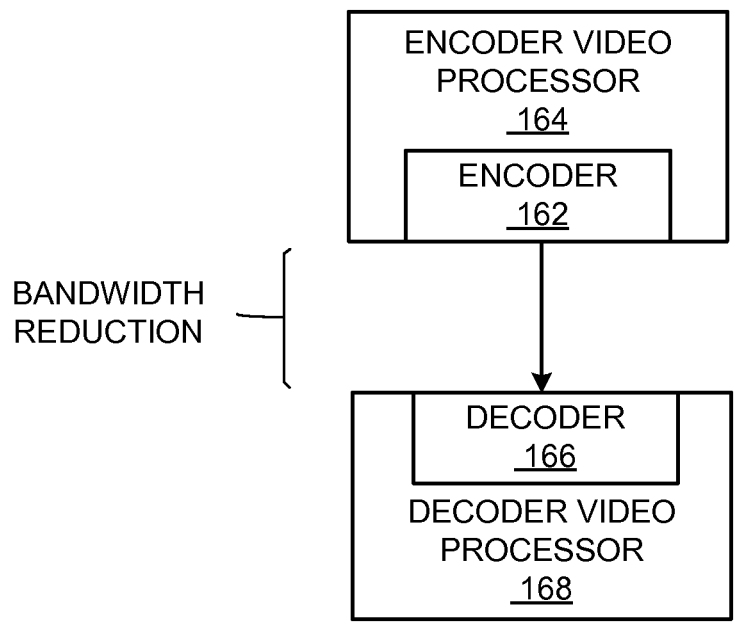
FIG. 1A is an example of a transfer use case for encoding and decoding.

Referring now to FIG. 1A, therein is shown an example of a transfer use case for encoding and decoding. An encoder 162 operating within an encoder video processor 164 can send the bitstream 120 having encoded and compressed video and image information to a decoder 166 operating within a decoder video processor 168.

In an illustrative example, the encoder 162 can include the pre-processing module 128 of FIG. 1, the transform module 130 of FIG. 1, and the encoding module 132 of FIG. 1. The decoder 166 can include the decoding module 134 of FIG. 1, the transform inversion module 142 of FIG. 1, and the post-processing module 146 of FIG. 1.

It has been discovered that encoding the source image 102 of FIG. 1 before sending the bitstream 120 to the decoder 166 increases performance and reduces bandwidth. By compressing the source image 102 using the encoder 162, the amount of data needed to transfer the information is reduced and requires less bandwidth to send to the decoder 166 where the information can be recreated without introducing visible artifacts.

Figure 1B:
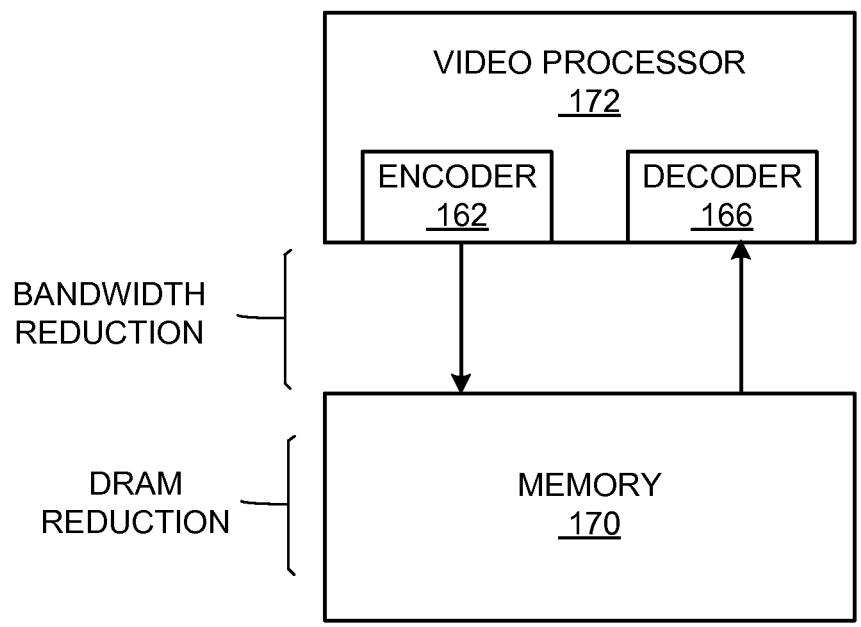
FIG. 1B is an example of a storage use case for encoding and decoding.

Referring now to FIG. 1B, therein is shown an example of a storage use case for encoding and decoding. The encoder 162 operating within a video processor 172 can send the bitstream 120 having encoded and compressed video and image information to an intermediate storage, such as a memory 170, for temporary storage or buffering. The decoder 166 operating within the video processor 172 can retrieve the bitstream 120 from the memory 170 for decoding and display.

It has been discovered that storing the bitstream 120 representing the source image 102 of FIG. 1 in an encoded format increases storage capacity and increases performance and flexibility. By compressing the information in the bitstream 120 before sending the bitstream 120 to the memory 170 reduces the amount of storage space, such as dynamic random access memory (DRAM). Encoding the data increases performance by reducing the amount of data needed by the decoder 166 without introducing visible artifacts.

Referring now to FIG. 2, therein is shown an example of the coefficient block. The wavelet coefficients 116 form a representation of one of the raw image blocks 126.

The wavelet coefficients 116 can be calculated by performing a wavelet transform on each of the pixel values of one of the raw image blocks 126. The wavelet coefficients 116 can represent time and frequency transforms of the raw image blocks 126. Although the wavelet coefficients 116 are described as being formed by a wavelet transformation, it is understood that the wavelet coefficients 116 can be formed by other transformations such as a discrete cosine transformation.

In an illustrative example, one of the raw image blocks 126 can be represented by the values denoted by "x". There is one of the x values for each of the 32 pixels of each of the raw image blocks 126.

The wavelet coefficients 116 can be calculated by applying the wavelet transform operation on the x-values of the raw image blocks 126. The pixels of the raw image blocks 126 can be represented by 32 of the wavelet coefficients 116.

The wavelet coefficients 116 can be allocated to different subbands. Three levels of wavelets can be used. For example, the wavelet coefficients 116 can be calculated for a lowpass subband 206, a third highpass subband 208, a second highpass subband 210, and a first highpass subband 212. Each of the subbands can represent a time and frequency range for the wavelet coefficients.

Figure 2A:
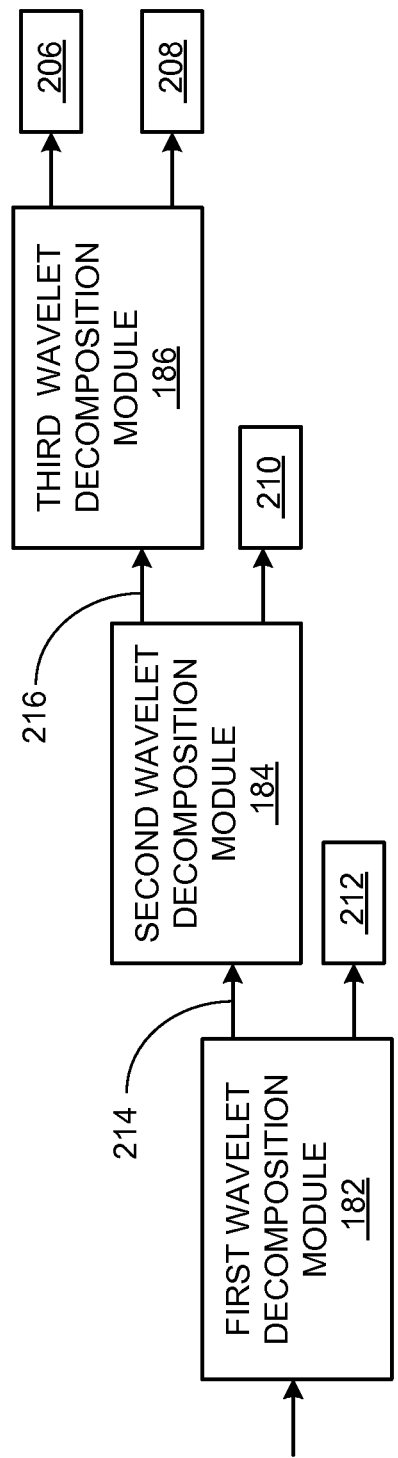
FIG. 2A is an example of a three-level wavelet transformation.

Referring now to FIG. 2A, therein is shown an example of a three-level wavelet transformation. The wavelet coefficients 116 can be allocated to three levels of wavelets to determine the lowpass subband 206, the third highpass subband 208, the second highpass subband 210, and the first highpass subband 212.

In an illustrative example, at each level of the Daubechies 5/3 integer wavelet transform, the lowpass ($Y_L$) and highpass ($Y_H$) subbands can be calculated with Equations 1, 2, and 3 as follows:

$$Y[2i] = X[2i] - \left\lfloor \frac{X[2i-1] + X[2i+1]}{2} \right\rfloor \text{ for } 0 \le i \le 16 \quad (1)$$

$$Y_H = Y[2i+1] = X[2i+1] + \left\lfloor \frac{Y[2i] + Y[2i+2] + 2}{4} \right\rfloor \text{ for } 0 \le i \le 15 \quad (2)$$

$$Y_L = Y[2i]|_{i=1,\ldots,15} \quad (3)$$

where X[i] are the pixel values of the block at FIG. 2 with index i. X[−1]=X[3] and X[0]=X[2] are obtained by symmetric extension of the image block 126.

For the next level of the wavelet transform, this process can be iterated on the lowpass subband $Y_L$ of the previous level. For example, the wavelet transform can be performed by wavelet decomposition modules, such as a first wavelet decomposition module 182, a second wavelet decomposition module 184, and a third wavelet decomposition module 186.

The first wavelet decomposition module 182 can perform a wavelet transform on the pixel values of one of the raw image blocks 126 to calculate a first lowpass component 214 and the first highpass subband 212.

The second wavelet decomposition module 184 can receive the first lowpass component 214 and perform the wavelet transform to calculate a second lowpass component 216 and the second highpass subband 210.

The third wavelet decomposition module 186 can receive the second lowpass component 216 and perform a wavelet transform to calculate the lowpass subband 206 and the third highpass subband 208.

The output of each of the wavelet decomposition modules can be receive by the next cascading stage to calculate the next set of lowpass and highpass components. The lowpass component from a previous stage can be further decomposed in each of the modules. The wavelet decomposition modules can be implemented in hardware or software.

Referring now to FIG. 3, therein is shown an example of the coefficient blocks bitplanes. The coefficient blocks 118 are a binary representation of the wavelet coefficients 116. The wavelet coefficients 116 are a time and frequency transformation of the raw image blocks 126 of FIG. 1.

Each of the coefficient blocks 118 includes representations of the bitplanes of the wavelet coefficients 116. Each wavelet bitplane 309 represents all of the bits at a particular bit depth of the binary values representing the wavelet coefficients 116.

The coefficient blocks 118 can include a current bitplane 302, a most significant bitplane 304, and a least significant bitplane 306. Each bitplane represents the bits at a particular bit depth of the wavelet coefficients 116 of the coefficient blocks 118. The current bitplane 302 represents the data of the bitplane being coded or decoded. The most significant bitplane 304 can represent the highest binary bit value of the wavelet coefficients 116. The least significant bitplane 306 can represent the lowest binary bit value of the wavelet coefficients 116.

Each bitplane can include an index position 308. For example, the index position 308 can range between 1 and 32. The index position 308 represents the location of one of the wavelet coefficients 116 in one of the coefficient blocks 118.

A higher bitplane 310 is a bitplane that has a greater value of the bitplane number "n" than the current bitplane 302. A lower bitplane 312 is a bitplane having a lower value of the bitplane number "n" than the current bitplane 302.

The wavelet coefficients 116 of the coefficient blocks 118 are allocated to different subbands representing time and frequency values. For example, the first four elements of each of the wavelet bitplanes can be allocated to the lowpass subband 206, the second four elements can be allocated to the third highpass subband 208, the next eight elements can be allocated to the second highpass subband 210, and the last sixteen elements can be allocated to the first highpass subband 212.

Figure 4:
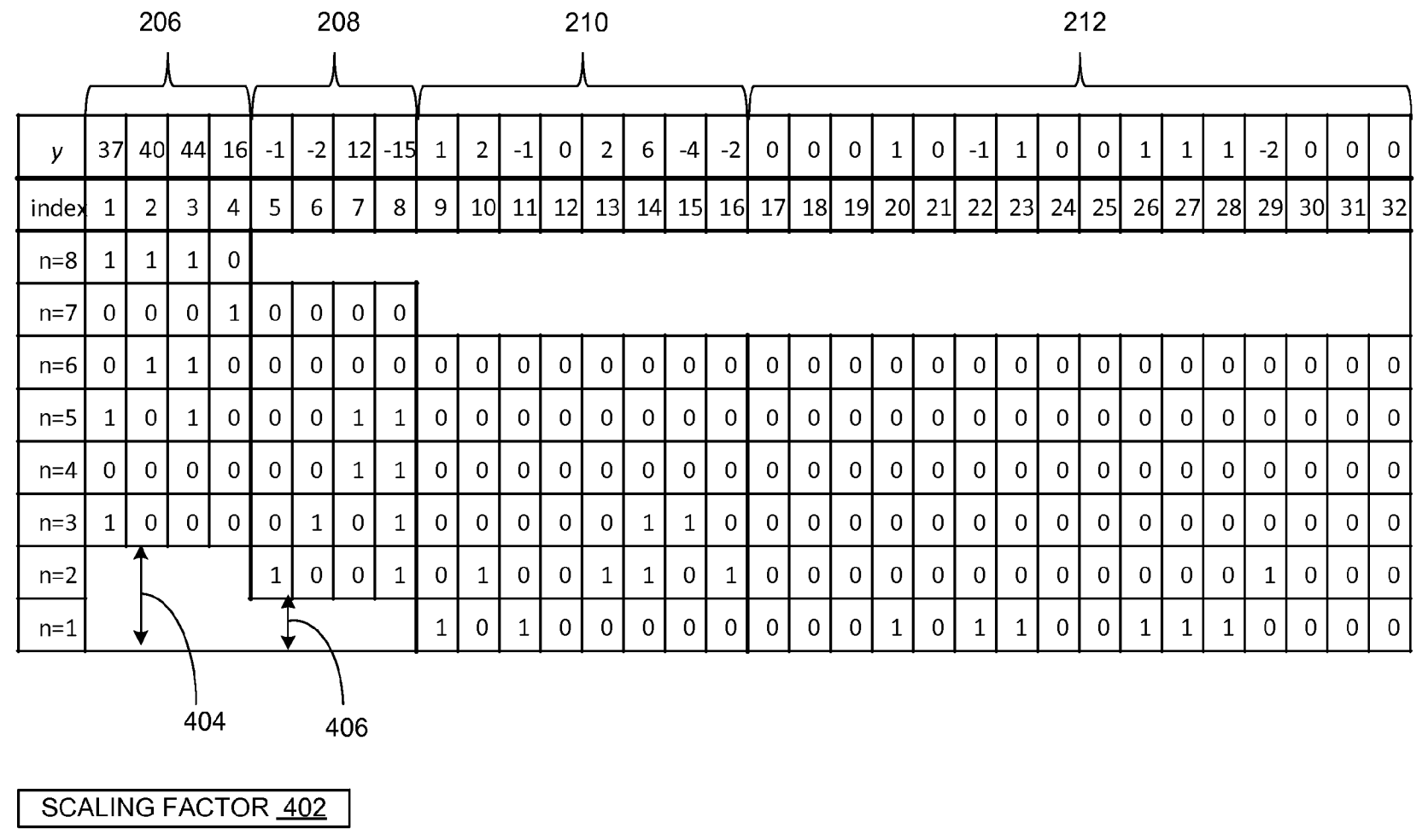

Referring now to FIG. 4, therein is shown a second example of the coefficient blocks bitplanes. The coefficient blocks 118 can be modified by selectively shifting the subbands by a scaling factor 402 to prioritize certain subbands by altering the scan pattern.

The lowpass subband 206 can be shifted by the scaling factor 402, such as a lowpass offset 404. For example, the lowpass subband 206 can be multiplied by four to shift the bit pattern of the wavelet coefficients 116 of FIG. 1 up by two bit positions. Shifting the values by two positions increases the effective value of the wavelet subbands and gives them more weight in the compressed values.

The third highpass subband 208 can be shifted by the scaling factor 402, such as a third highpass offset 406. For example, the third highpass subband 208 can be multiplied by 2 to shift the bit pattern of the wavelet coefficient up by one bit position.

The prioritization scheme can prioritize each of the subbands differently. In yet another example, the second highpass subband 210 and the first highpass subband 212 can remain unshifted.

To lower the dynamic range of the wavelet coefficients 116 of the lowpass subband, the raw image blocks 126 of FIG. 1, such as for the luma component, can be subtracted by the offset $2^{bitdepth-2}$. In another example, the chroma component offset can be $2^{bitdepth-1}$.

It has been discovered that upshifting the lowpass subband 206 can improve the compression performance by prioritizing the lower frequency information in the coefficient blocks 118. Prioritizing the lower frequency information can improve compressed image quality by compressing the most representative image data.

Referring now to FIG. 5, therein is shown an example of a coefficient significance vector 502. The coefficient significance vector 502 (CSV) is a data structure used to identify the significance of a bit value in the coefficient blocks 118.

The coefficient significance vector 502 is a vector of the same size as the coefficient blocks 118 of FIG. 1. Each element in the coefficient significance vector 502 can have four discrete element values.

An element value of "0" indicates an initial value. An element value of "1" indicates that the corresponding bit position for wavelet coefficients 116 up to the current bitplane is insignificant. An insignificant coefficient has a value of 0 for the current and higher bitplanes.

An element value of 2 indicates that the corresponding bit position at the current or higher bitplanes for wavelet coefficients 116 is a significant coefficient having a significant value 506. The significant value 506 indicates that an element is important and should be analyzed. An element value of 3 indicates that the corresponding bit position for wavelet coefficients 116 has just become a significant coefficient in the current bitplane 302 of FIG. 3.

A significant coefficient has at least a significant value 506 of value 1 in the bitplanes up to the current bitplane. The significant value can indicate that the location is a non-zero value and can be handled differently from an insignificant value. The insignificant value can indicate that the location has a zero-value up to the current bitplane.

A wavelet coefficient 116 is called significant at a bitplane n if it has a value of "1" at a higher bitplane n1>n. A wavelet coefficient 116 is called insignificant at a bitplane n if it has a value of "0" at all higher bitplanes n1>n.

The values of a new state 504 of the coefficient significance vector 502 can be calculating by detecting which of the previous values of the coefficient significance vector 502 is significant. A value is significant if it has a value of 1 at a higher bitplane. The new state 504 of the coefficient significance vector 502 can be based on the current value of the coefficient significance vector 502 and the presence of a "1" value in the same index position for one of the previous values of the coefficient significance vector 502.

Referring now to FIG. 6, therein is shown an example of a partition significance vector 602. The partition significance vector 602 (PSV) is a data structure used to identify the significance of coefficient partitions 604 in the coefficient block 118 of FIG. 1.

The coefficient partitions 604 are subsets of a bitplane of the coefficient block 118. The partition significance vector 602 is a vector with length Np=N/P where P is the partition size. N can be the bitplane length. For a 32×1 image block, N can be 32. The coefficient partitions 604 can have a partition bit pattern 612. The partition bit pattern 612 is the pattern of bits within one of the coefficient partitions 604.

The coefficient partitions 604 can have a partition size 610. For example, the partition size 610 can be 4 and the partition significance vector 602 can have a length of 32/4=8. This indicates that the coefficient block 118 can have 8 partitions of four bits each. The partition significance vector 602 can have 8 elements. The partition size 610 can be the vector length Np.

Each element can take two values. An element value of "0" indicates an initial value. An element value of "1" indicates that the partition is a significant partition. A significant partition 608 is a partition having a bit element with a value of 1. The coefficient partitions 604 are significant if they have a nonzero or "1" value. Otherwise the coefficient partitions 604 are insignificant.

Figures 7, 8, 9:
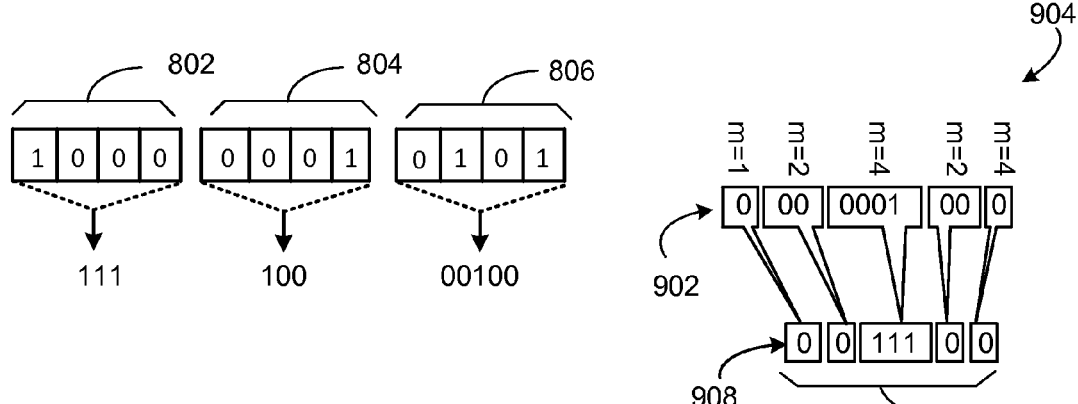
FIG. 7 is an example of a Golomb code table.
FIG. 8 is an example of a Golomb coding.
FIG. 9 is an example of adaptive run-length encoding.

Referring now to FIG. 7, therein is shown an example of a Golomb code table 702. The Golomb code table 702 can map a bit sequence to a Golomb coded value 708. The Golomb code table 702 can be used to implement a binary adaptive Golomb coding (BAG) technique.

For example, the Golomb code table 702, such as a luma Golomb coding table 704, can provide a mapping between a luma bit pattern 706 and the Golomb coded value 708, such as a Golomb luma code 710 for luma values. In another example, the Golomb code table 702, such as a chroma Golomb coding table 712 can provide a mapping between a chroma bit sequence 714 and the Golomb coded value 708, such as a Golomb chroma code 716 for chroma values. The Golomb coded value 708 is a substation bit sequence for replacing frequently used bit sequences with shorter bit patterns for compression.

Although the current examples are for the Golomb code table 702 for a YUV color model, it is understood that the Golomb code table 702 can be used to encode other color models. For example, the Golomb code table 702 could be used to encode other color models such as Red-Green-Blue (RGB), Cyan-Magenta-Yellow-Key (CMYK), or other similar color models.

The Golomb code table 702 can be calculated in different ways. For example, the Golomb code table 702 can be calculated based on statistical values, use frequency, based over a pre-determined image set 718, or a combination thereof. The pre-determined image set 718 can is a set of images characteristic of a certain image type. For example, the pre-determined image set 718 can be image for faces, scenery, crowds, or similar types of images.

Referring now to FIG. 8, therein is shown an example of a Golomb coding. The Golomb code table 702 of FIG. 7, such as the luma Golomb coding table 704 of FIG. 7 can provide a mapping between a partition bit pattern 612 of FIG. 6 and the Golomb coded value 708 of FIG. 7, such as the Golomb luma code 710 of FIG. 7 for luma values. The Golomb coding can include binary adaptive Golomb coding.

A first partition 802 having the partition bit pattern 612 of "1 0 0 0" can be mapped to the Golomb coded value 708 of "1 1 1". A second partition 804 having the partition bit pattern 612 of "0 0 0 1" can be mapped to the Golomb coded value of "1 0 0". A third partition 806 having the partition bit pattern 612 of "0 1 0 1" can be mapped to the Golomb coded value of "0 0 1 0 0".

Referring now to FIG. 9, therein is shown an example of adaptive run-length encoding. A test sequence 902 can be encoded using a repeat value indicator 904, such as "m", can be incremented after an increasing sequence of "0" bit values is detected. For example, the repeat value indicator 904 can be increased by a factor of 2 each time an additional repeated "0" value is encountered. The test sequence 902 can form an encoded sequence 906, such as a run-length coded value 908. The encoded sequence 906 is shorter than the test sequence 902.

The repeat value indicator 904 can indicate the number of newly detected sequential "0" bit values in the test sequence 902. The repeat value indicator 904 can be decremented by a factor of 2 each time a different value occurs.

In an example of adaptive run-length encoding, sequences of "0" values can be encoded with a geometrically increasing set of values. Where m represent a length of a portion of a binary sequence, "m" can be increased by a factor of 2 if a run of "m" "0" values is encountered. If the run of "0" values is less than the current value of "m", then m can be divided by 2. The test sequence 902 having a value of "0 0 0 0 0 1 0 0 0" can be encoded by a value of "0 0 1 1 1 0 0". The encoded value has 7-bits and the test sequence 902 has 10-bits.

In another example, sequences of repeating "0" values, also known as runs, can be coded for compression. Runs of "m" "0" values can be coded a modifier and a "0" value. A sequence of "p" zeros and a terminating "1" value "0 0 . . . 0 1" can be coded with a flag value and a number, such as "1" with k bits representing a binary representation of "p".

Figure 10:
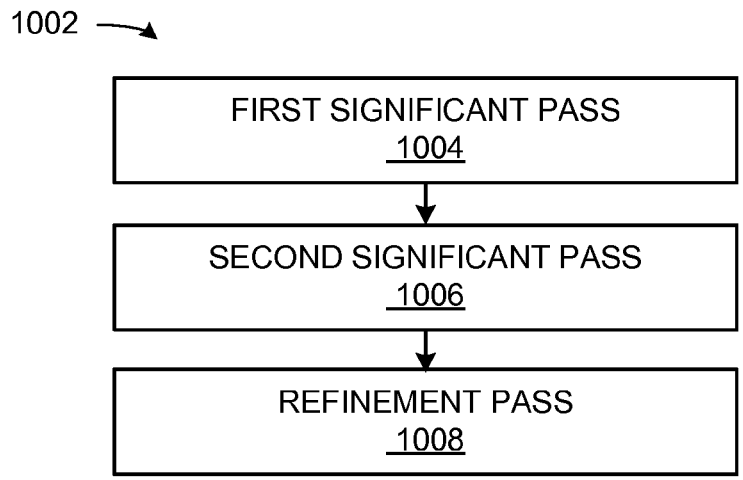
FIG. 10 is an example of coding passes.

Referring now to FIG. 10, therein is shown an example of coding passes 1002. The coding process can perform three passes through the data to encode entirety of the source image 102 of FIG. 1. The coding process can include a first significant pass 1004, a second significant pass 1006, and a refinement pass 1008.

The first significant pass 1004 can pre-process the current bitplane 302 of each of the coefficient blocks 118. The first significant pass 1004 can detect bits that have a value of "1" and flag them as significant. The first significant pass 1004 is described in detail below.

The second significant pass 1006 can encode the data from the current bitplane 302 of FIG. 3 using an adaptive run-length encoding as well as other coding techniques to compress the data. For example, the second significant pass 1006 can employ a Golomb code to encode the bits of the coefficient blocks 118. The second significant pass 1006 is described in detail below.

The refinement pass 1008 can update intermediate values and store state information used to compress the data of the coefficient blocks 118 of FIG. 1. The refinement pass is described in detail below.

Figure 11:
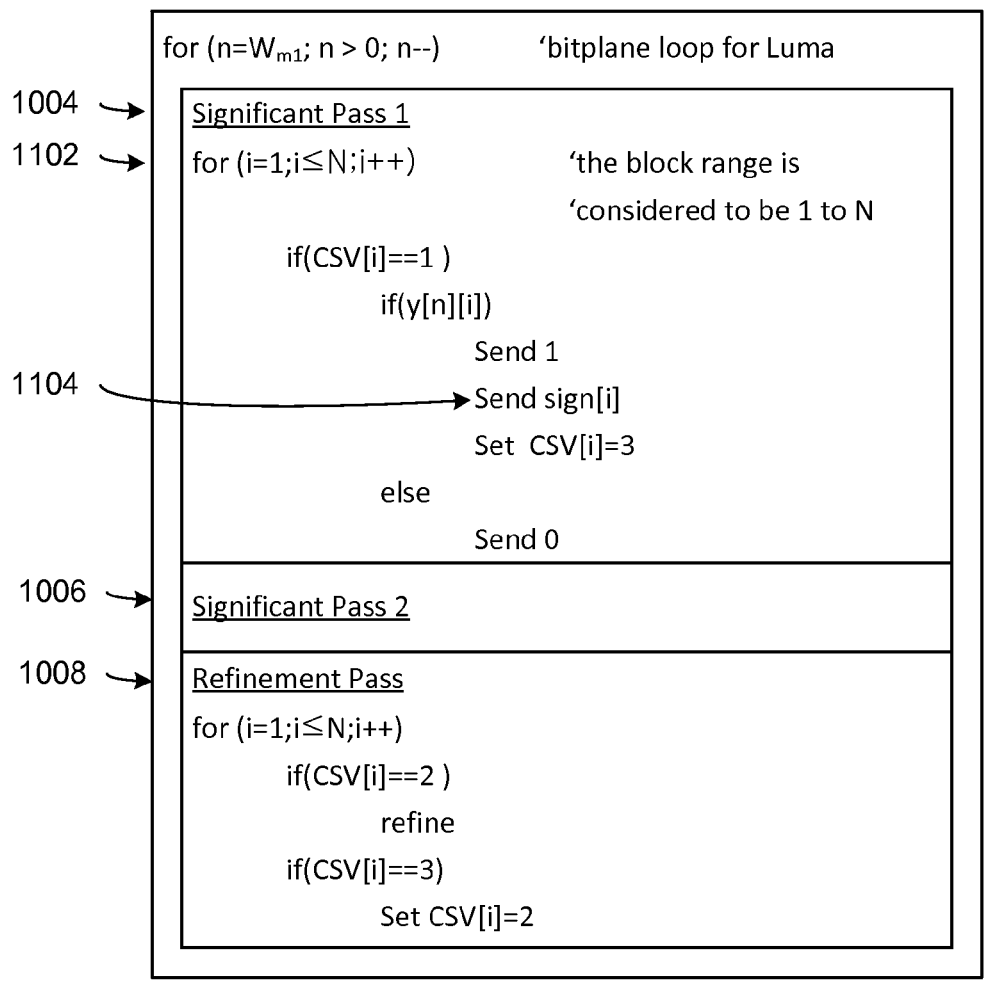
FIG. 11 is an example of pseudo code for the three main coding passes.

Referring now to FIG. 11, therein is shown an example of pseudo code for the three main coding passes. The encoding module 132 of FIG. 1 can perform each of the three main coding passes; the first significant pass 1004, the second significant pass 1006, and the refinement pass 1008.

The encoding module 132 can iterate over the set of all of the coefficient blocks 118 of FIG. 1. Each of the raw image blocks 126 can be transformed into the coefficient blocks 118 of FIG. 1 by performing a wavelet transformation on the raw image blocks 126 in the transform module 130 of FIG. 1. The coefficient blocks 118 can be received from the transform module 130 by the encoding module 132.

Each of the coefficient blocks 118 can be compressed using a run-length encoding together with an entropy coding technique such as Golomb coding. For example, the Golomb coding can include binary adaptive Golomb coding.

The encoding module 132 can implement a binary adaptive bitplane coding technique for images. The encoding module 132 can compress the coefficient blocks 118 to from the bitstream 120 of FIG. 1 to represent the raw image blocks 126 of the source image 102 in the compressed form. The coefficient blocks 118 can be calculated using a wavelet transform, a discrete cosine transform, or a combination thereof.

The functionality of the encoding module 132 can be divided into three phases; the first significant pass 1004, the second significant pass 1006, and the refinement pass 1008. The encoding module 132 can iterate over all of the bitplanes of the coefficient blocks 118.

The term "n" can represent the current bitplane 302 of FIG. 3 of one of the coefficient blocks 118. The term "$W_{m1}$" can represent the maximum number of bitplanes in one of the coefficient blocks 118. The term "i" can be the coefficient index. The term y[n][i] can denote the wavelet coefficient bit at bitplane n and index i.

The bitplanes can be iterated from the most significant bitplane 304 of FIG. 3 to the least significant bitplane 306 of FIG. 3. At initialization, the CSV 502 of FIG. 5 and the PSV 602 of FIG. 6 can be initialized to all zero values. All three coding passes for the current bitplane can be performed before going on to the next bitplane and repeating. The process for each block of the coefficient blocks 118 of FIG. 1 continues until all bits of the block are coded or the target bit budget 152 of FIG. 1 is reached.

For the first significant pass 1004, the pseudo code can iterate over all indices of the coefficient block. The index "i" of the blocks range can vary from 1 to N for each block, where N is the block size for each of the coefficient blocks 118. The first significant pass 1004 can calculate the significant values of the CSV 502.

If the current value of the CSV 502 at the index position 308 has a value of "1", then the pseudo code can check the value of a current bit position 1102 of the current bitplane 302 for one of the coefficient blocks 118. If the current bit position 1102 has a value of "1", then the pseudo code can send a value of "1" to the bitstream 120, send a sign bit 1104 for the current bit position 1102, and set the CSV 502 value of the current bit position 1102 to 3 to indicate the significance of the current bit position 1102 in the current bitplane 302 of the coefficient block 118.

If the current value of the CSV 502 at the index position 308 has a value of "1", and if the current bit position 1102 has a value of "0", then the pseudo code can send a value of "0" to the bitstream 120

After the first significant pass 1004 has completed, the control flow can pass to the second significant pass 1006. For example, for the second significant pass 1006, the bitplanes can be divided into coefficient partitions of 4 bits. The second significant pass 1006 is described in detail below.

After the second significant pass 1006 has completed, the control flow can pass to the refinement pass 1008. The refinement pass 1008 can check the value of the CSV 502. If the CSV 502 for the current bit position 1102 equals 2, then the current bit position 1102 is significant and the refinement operation can be performed. If the CSV 502 for the current bit position 1102 is 3, indicating that the current bit position 1102 has just become significant, then the pseudo code for the refinement pass 1008 can set the value of the CSV 502 at the current bit position to a value of 2 to indicate the bit position is significant. The refinement operation can send the value of the wavelet coefficient at index I and bitplane "n" to the bitstream.

It has been discovered that calculating the coefficient significance vector 502 increases processing efficiency. Classifying the significance and insignificance of the wavelet coefficients 116 of FIG. 1 can reduced the amount of processing required to compress the data.

Figure 12:
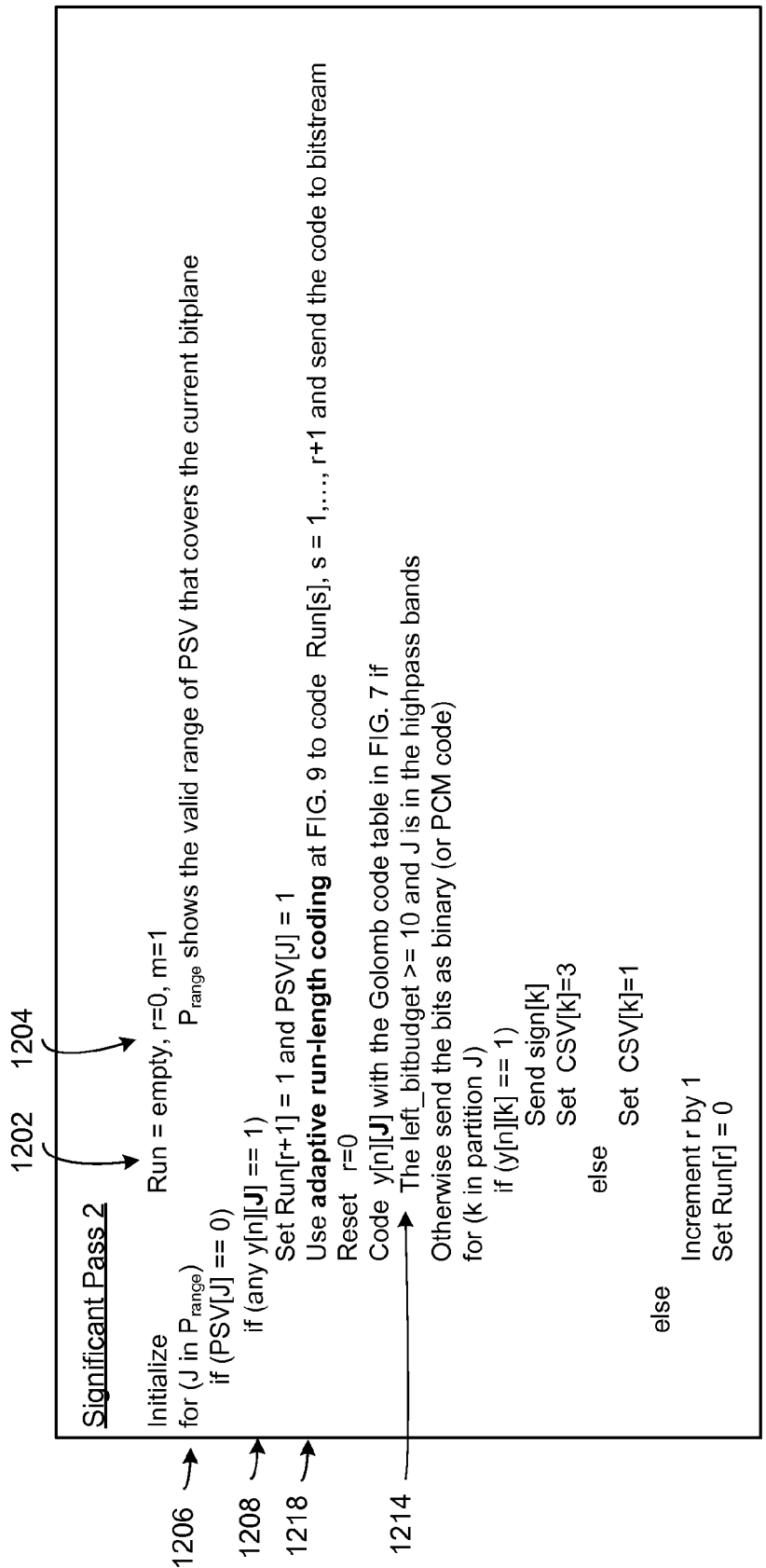
FIG. 12 is an example of pseudo code of the second significant pass of FIG. 10.

Referring now to FIG. 12, therein is shown an example of pseudo code of the second significant pass 1006 of FIG. 10. The second significant pass 1006 can encode the coefficient blocks 118 of FIG. 1.

The coefficient blocks 118 can be encoded and compressed in a variety of ways. For example, the coefficient blocks 118 can be encoded using adaptive run-length encoding techniques, Golomb coding, binary adaptive Golomb coding, pulse-code modulation, binary values, or a combination thereof.

The second significant pass 1006 can initialize the system by setting the value for some of the parameters. For example, the second significant pass 1006 can initialize a run vector 1202 to be empty and a run counter 1204 to be zero. The term "J" can indicate the partition number.

The value of $P_{range}$ can be set to the valid range of the PSV 602 of FIG. 6 that covers the current bitplane 302 of FIG. 3. For example, if the valid range of the PSV 602 extends only from index=5 to index=32, or J=2 to J=8, then the $P_{range}$ can be set to [2, 3, . . . , 8] to indicate only the partition numbers from 2 to 8 should be checked.

The second significant pass 1006 can divide the coefficient blocks 118 into coefficient partitions 604 of FIG. 6. In an illustrative example, where the coefficient blocks 118 are sized at 32×1, then each of the coefficient partitions 604 can be 4 bits wide for a total of 8 partitions for each bitplane.

The second significant pass 1006 can process the data of the coefficient blocks 118 by iterating over the set of the coefficient partitions 604. Each of the coefficient partitions 604 can be processed to compress the data of one of the bitplanes of the coefficient blocks 118.

The PSV 602 can be coded by starting with J=1 using adaptive run-length coding for those PSV[J] that are currently 0. The bit values at bitplane n and partition J, y[n][J]={y[n][4J], y[n][4J+1], y[n][4J+2], y[n][4J+3]}, can be coded using Golomb coded values from FIG. 7 if there are at least 10 bits available in the bit budget and J is not in the lowpass subband 206 of FIG. 2.

Otherwise, the coefficient partition 604 for "J" is coded as binary values or pulse code modulation. Then the sign bits of y[n][J] are coded for those coefficient where y[n][i]=1. Then CSV[i] is set to 3 if y[n][i]=1 or CSV[i] is set to "1" if y[n][i]=0. Then continue coding PSV from J+1.

Run denotes part of the PSV 602 coded before coding a significant partition. If a run of only "0" values is encountered, then one codes the run and not any partition. Where m=1, the initial parameter for adaptive run-length coding is set before each bitplane.

The associated pseudo code is described as follows. If the PSV 602 of a current partition 1206 has a value other than "0", then the partition is considered significant and has one or more values of "1" in the partition. The control flow can go on to the next partition.

If the PSV 602 of the current partition has a value of "0" to indicate that the current partition 1206 is not significant, then the pseudo code shows how the data is processed. In the else condition, if the bits for the wavelet coefficients 116 for the current bitplane 302 and the current partition 1206 are 0, then the run counter 1204 can be incremented by one and the run vector 1202 element for the run counter 1204 can be set to 0.

If the wavelet coefficients 116 of FIG. 1 for the current bitplane 302 and the current partition 1206 have at least a value of 1, then adaptive run-length coding can be performed to encode the data. The next value of the run vector 1202 can be set to "1" and the PSV 602 for the current partition 1206 can be set to 1.

The second significant pass 1006 can then perform an adaptive run-length encoding to send the current values of the run vector 1202 to the bitstream 120 of FIG. 1. The run vector 1202 can contain a set of "0" and "1" values having a length of the run counter 1204. The adaptive run-length encoding can be performed as shown in FIG. 7.

After the adaptive run-length encoding, the run counter 1204 can be reset to 0. If an available bit budget 1214 is greater than or equal to 10 bits and the current partition 1206 is in the highpass subband range, then the bit of the wavelet coefficients 116 for the current bitplane 302 and the current partition 1206 can be encoded with the Golomb coded value 708 of FIG. 7 for luma values and FIG. 8 for chroma values and sent to the bitstream 120. Otherwise, the data can be sent the bitstream 218 as binary or pulse code modulation data.

For each bit of a bit sequence 1208 "k" of the current partition 1206, the pseudo code can check if the bit equals 1. If true, then the sign of the k-th bit position can be sent to the bitstream 120 and the CSV 502 of FIG. 5 for position "k" can be set to 3. Otherwise, the CSV for position "k" can be set to "1".

It has been discovered that encoding the bitstream bitplanes with both the run-length coded value 908 of FIG. 9 and the Golomb coded value 708 increases compression efficiency. Encoding the coefficient partitions 604 and wavelet coefficients 116 increases the level of compression.

Figure 13:
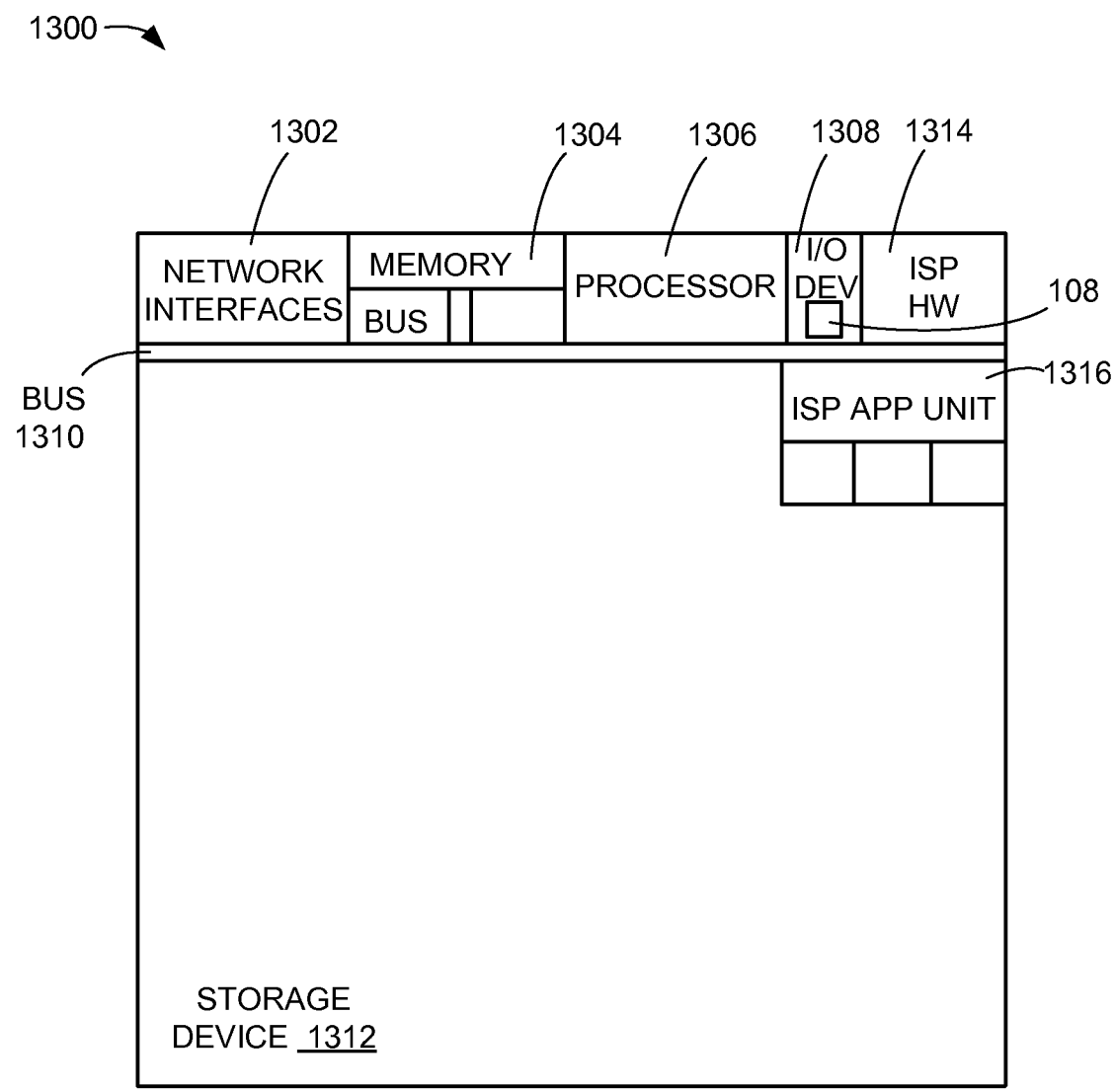
FIG. 13 is an example of a block diagram of an image processing system with Golomb encoding in an embodiment of the present invention.

Referring now to FIG. 13, therein is shown an example of a block diagram of an image processing system 1300 with Golomb encoding in an embodiment of the present invention. The image processing system 1300 can be used to acquire, store, compute, communicate, and display information including images and videos.

The image processing system 1300 can include a hardware structure implemented with any number of hardware units including network interfaces 1302, a memory 1304, a processor 1306, input/output devices 1308, a bus 1310, and a storage device 1312. An example of the network interfaces 1302 can include a network card connected to an Ethernet or other types of local area networks (LAN). As a specific example, the LAN can include Bluetooth, Near Field Communication (NFC), wireless LAN, Long-Term Evolution (LTE), Third Generation (3G), and Enhanced Data rates for GSM Evolution (EDGE).

The memory 1304 can include any computer memory types. The processor 1306 can include any processing unit with sufficient speed chosen for data control and computation operations of the hardware units in the image processing system 100.

The input/output devices 1308 can include one or more input/output units including a keyboard, a mouse, a monitor, a display, a printer, a modem, a touchscreen, a button interface, and any other input/output units. The storage device 1312 can include any storage units including a hard drive, a compact disc read-only memory (CDROM), a compact disc rewritable (CDRW), a digital video disc (DVD), a digital video disc rewritable (DVDRW), and solid state or flash memory. The storage device 1312 and the memory 1304 and can be used to store data for processed by any of the units in the image processing system 100.

The image processing system 100 can include functions for image processing of the images and the videos. The image processing functions can be implemented with hardware, software, or any combination thereof. The image processing system 100 can include an image signal processing hardware 1314 and an image signal processing application unit 1316.

The image signal processing hardware 1314 can include any hardware units for processing images including dedicated circuitry, a processor, an integrated circuit, and integrated circuit cores. The image signal processing application unit 1316 can include software including machine code, firmware, embedded code, or application software.

The image processing system 100 can represent or can be implemented in computing devices. For example, the computing devices can include a personal computer, a laptop computer, a computer workstation, a server, a mainframe computer, a handheld computer, a personal digital assistant, a cellular/mobile telephone, a smart appliance, and a gaming console.

Also for example, the computing devices can include a cellular phone, a digital camera, a digital camcorder, a camera phone, a music player, a multimedia player, a video player, a DVD writer/player, a television, a home entertainment system, or any other computing devices. As a specific example, the computing devices can include Cyber-Shot® cameras, CMOS sensor Digital Still Cameras (DSC), Handycam camcorders, and single-lens reflex (SLR) cameras. As another specific example, the computing devices can include Point-and-shoot cameras, video camcorders, single-lens reflex (SLR) cameras, mirrorless cameras, and cameras in mobile devices.

The input/output devices 1308 can include the imaging device 108. For example, the imaging device 108 can be used to capture images or video. The input/output devices 1308 can also include the display device 150 of FIG. 1 to display image information. The display device 150 can be units that present visual representations of images or any visual information. The display device 150 can utilize a variety of display technologies such as LCD, LED-LCD, plasma, holographic, OLED, front and rear projection, CRT, or other display technologies.

The video captured by the imaging device 108 can be considered as a series of images which can further be broken down into raw image blocks 126 of FIG. 1, for example. The imaging device 108 is shown as connected to the processor 1306 and the image signal processing hardware 1314, but it is understood that the imaging device 108 can be separate from the processor 1306.

In addition, the processor 1306 can be physically separate from the display device 150. The imaging device 108, the processor 1306, and the display device 150 can all be connected physically or wirelessly, through the network interfaces 1302, for example, as required by usage patterns. For example, the imaging device 108 can be a video camera capable of a wired or wireless connection to a display device having the processor 1306 and the display device 150. As another example, the imaging device 108 and certain sub-units of the image signal processing hardware 1314 can be contained within a camera capable of wired or wireless connection to a display device having the remaining sub-units of the image signal processing hardware 1314 and the display device 150 which can display resulting video.

Regardless of how the imaging device 108, the processor 1306, and the display device 150 are connected, the display device 150 can output decoded image blocks as decoded video after processing of the input image blocks by the image signal processing hardware 1314. The quality of the resulting video can be determined by the particular compression scheme used when transmitting image block data, for example.

Figure 14:
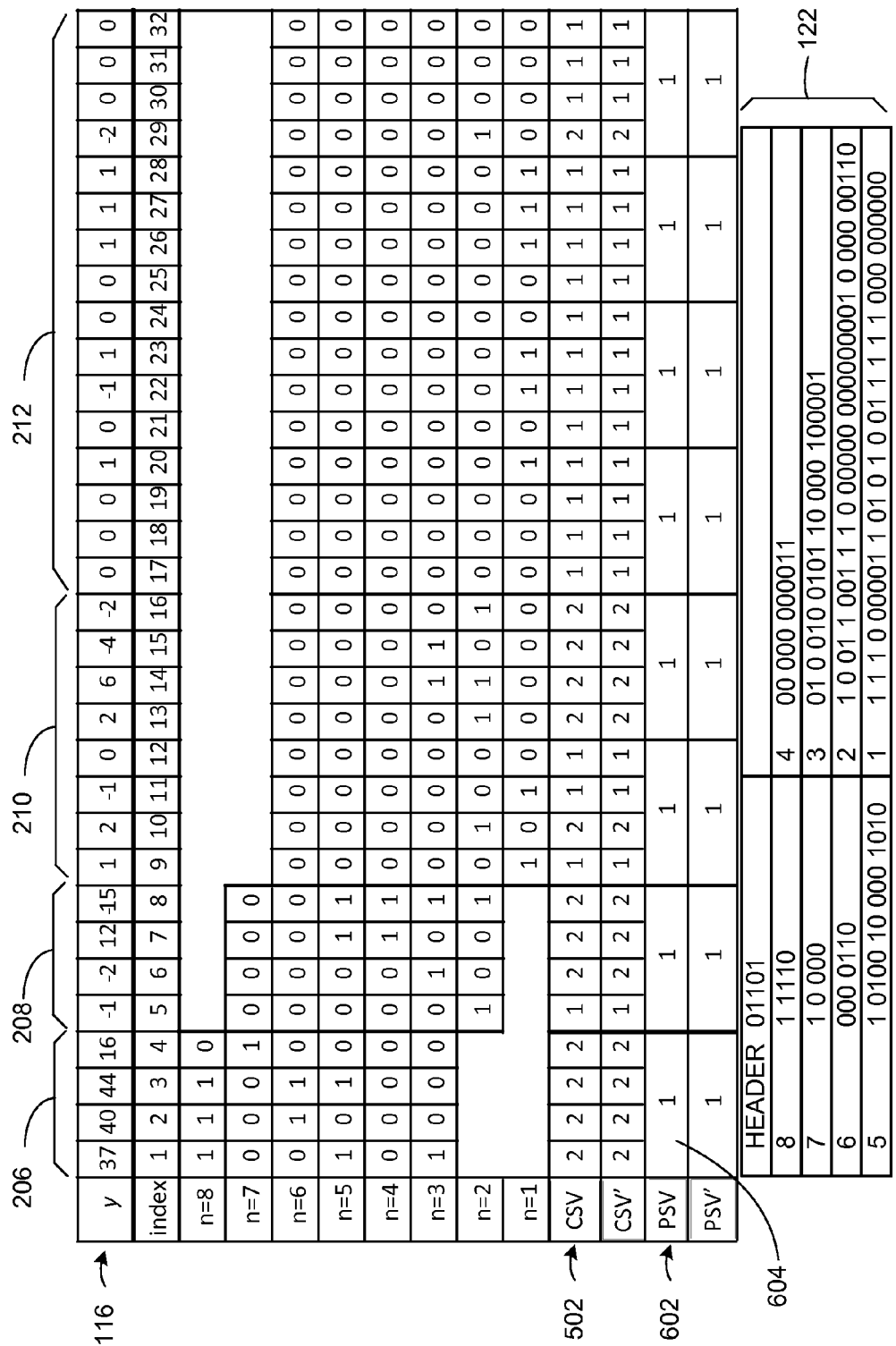
FIG. 14 is an example of the encoded block.

Referring now to FIG. 14, therein is shown an example of the encoded block 122. The encoded block 122 can represent one of the coefficient blocks 118 of FIG. 1.

Each of the coefficient blocks 118 can include the lowpass subband 206, the third highpass subband 208, the second highpass subband 210, and the first highpass subband 212. The coefficient blocks 118 can include the wavelet coefficients 116.

The coefficient significance vector 502 can be used to indicate the significance of each of the bit of the wavelet coefficients 116. The partition significance vector 602 can be used to indicate the significance of each of the coefficient partitions 604.

In an illustrative example, the values of the encoded block 122 for each bitplane are described as follows. For bitplane eight, as value J is iterated over the set of partitions, for one of the coefficient partitions 604 in the lowpass subband 206, the value of "1 1 1 0" is coded as "1 1 1 0", a simple binary representation.

For bitplane seven, in the first significant pass 1004 of FIG. 10, y[7][4]=1 so a value of 1 is sent to the bitstream 120 of FIG. 1. The second partition is all "0" values, so another "0" value is sent to the bitstream 120. The refinement pass 1008 of FIG. 10 inserts a value of "0 0 0".

For bitplane six, the second significant pass 1006 of FIG. 10 encoded "0 0 0 0 0 0" can be encoded as "0 0 0". The refinement pass 1008 inserts a value of "0 1 1 0".

For bitplane five, the second significant pass 1006 starts with a "1" value. Then the Golomb code for "0 0 1 1" is coded as "0 1 0 0". Then the sign is coded as "1 0". After coding the partition J=2, the PSV[2] is coded where all the partition bits are 0, so the value "0 0 0 0 0 0" is coded as "0 0 0". The refinement pass 1008 inserts a value of "1 0 1 0".

For bitplane four, the first significant pass 1004 insert a value of "0 0" into the bitstream 120. The second significant pass 1006 encoded the value of "0 0 0 0 0 0" as "0 0 0". The refinement pass 1008 inserts a value of "0 0 0 1 1".

For bitplane three, the first significant pass 1004 inserts a value of "0 1 0". The second significant pass 1006 inserts an adaptive run-length coding value of "0 1 0" and a Golomb code value of "0 1 0 1", and the sign values of "1 0". Then it inserts "0 0 0" for the second run. The refinement pass 1008 inserts a value of "1 0 0 0 0 1".

For the last 2 bitplanes of Luma, all bits are processed in significant pass 1 and the refinement pass. This is carried out after coding n=3 bitplane by changing CSV values from 0 to 1 and setting all PSV values to 1 in order to bypass significant pass 2. For Chroma components, this practice is applied to the last bitplane n=1.

Therefore, for bitplane two, the first significant pass 1004 inserts a value of "1 0 0 1 1 0 0 1 1 1 0 0 0 0 0 0 0 0 0 0 0 1 0 0 0". The refinement pass 1008 inserts a value of "0 0 1 1 0". For bitplane one, the first significant pass 1004 inserts a value of "1 1 1 0 0 0 0 0 1 1 0 1 0 1 1 0 0 1 1 1 1 1 1 0 0 0".

Figure 15:
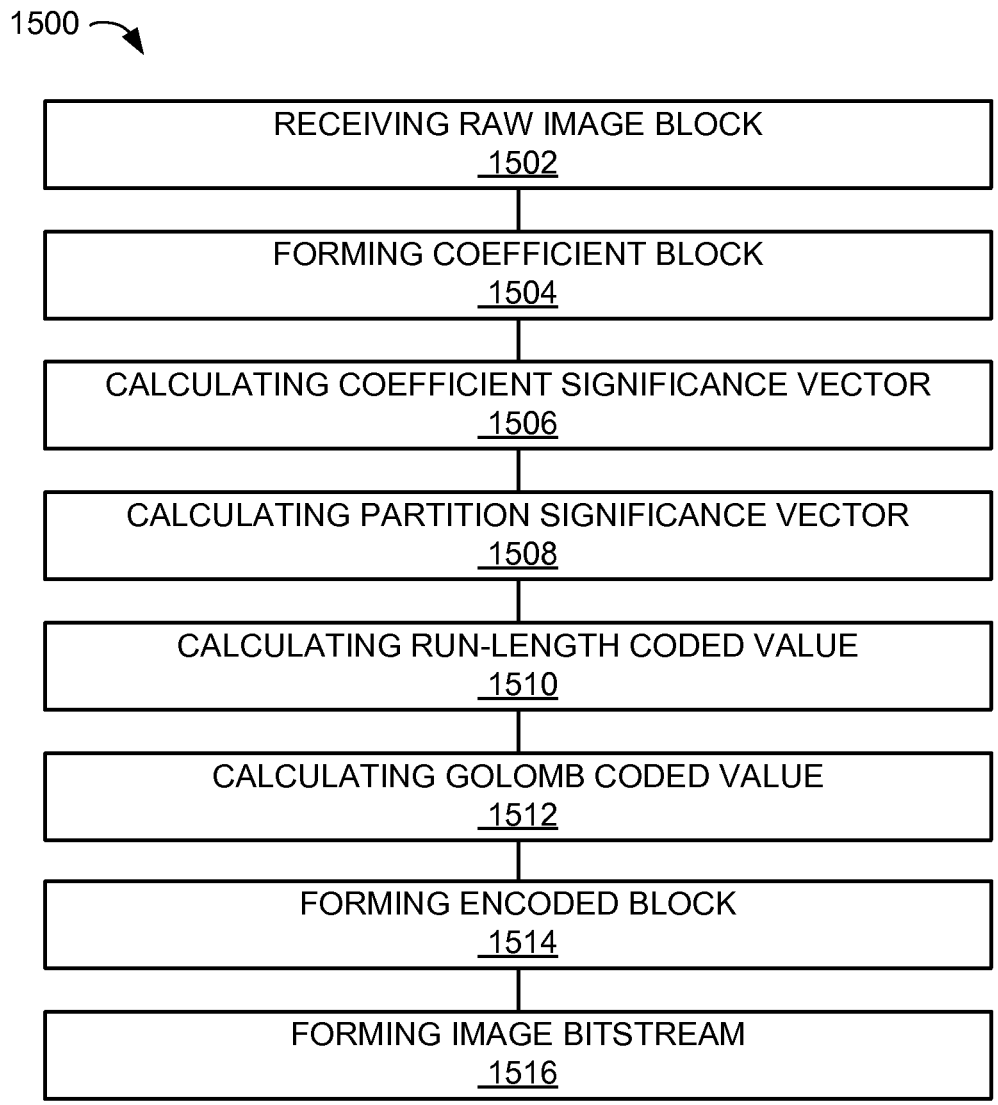
FIG. 15 is a flow chart of a method of operation of the imaging processing system in a further embodiment of the present invention.

Referring now to FIG. 15, therein is shown a flow chart of a method 1500 of operation of the imaging processing system in a further embodiment of the present invention. The method 1500 includes: receiving a raw image block of a source image from an imaging device in a block 1502; forming a coefficient block by performing a transform operation on the raw image block, the transform operation including a wavelet transform or a discrete cosine transform in a block 1504; calculating a coefficient significance vector for a current bitplane of the coefficient block, the coefficient significance vector having a significant value set at each index position having a non-zero value at a higher bitplane in a block 1506; calculating a partition significance vector for the current bitplane of the coefficient block, the partition significance vector having the significant value for each wavelet partition having a non-zero value in a block 1508; calculating a run-length coded value for a portion of the partition significance vector in a block 1510; calculating a Golomb coded value for a portion of a significant partition in a block 1512; forming an encoded block having the run-length coded value and the Golomb coded value in a block 1514; and forming a bitstream having the encoded block in a block 1516.

It has been discovered that the embodiments of the present invention thus have numerous aspects. The embodiments of the present invention valuably support and service the historical trend of reducing costs, simplifying systems, and increasing performance. These and other valuable aspects of the embodiments of the present invention consequently further the state of the technology to at least the next level.

Thus, it has been discovered that the image processing system of the embodiments of the present invention furnishes important and heretofore unknown and unavailable solutions, capabilities, and functional aspects for processing image content. The resulting processes and configurations are straightforward, cost-effective, uncomplicated, highly versatile and effective, can be surprisingly and unobviously implemented by adapting known technologies, and are thus readily suited for efficiently and economically manufacturing image coding devices fully compatible with conventional manufacturing processes and technologies. The resulting processes and configurations are straightforward, cost-effective, uncomplicated, highly versatile, accurate, sensitive, and effective, and can be implemented by adapting known components for ready, efficient, and economical manufacturing, application, and utilization.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A method of operation of an image processing system comprising:
   receiving a raw image block of a source image from an imaging device;
   forming a coefficient block by performing a transform operation on the raw image block, the transform operation including a wavelet transform or a discrete cosine transform;
   calculating a coefficient significance vector for a current bitplane of the coefficient block, the coefficient significance vector having a significant value set at each index position having a non-zero value at a higher bitplane;
   calculating a partition significance vector for the current bitplane of the coefficient block, the partition significance vector having the significant value for each coefficient partition having a non-zero value;
   calculating a run-length coded value for a portion of the partition significance vector;
   calculating a Golomb coded value for a portion of a significant partition;
   forming an encoded block having the run-length coded value and the Golomb coded value; and
   forming a bitstream having the encoded block.

2. The method as claimed in claim 1 wherein a wavelet coefficient of the lowpass subband of the coefficient block is prioritized by multiplying by a scaling factor.

3. The method as claimed in claim 1 wherein a Golomb code table is optimized over a pre-determined image set.

4. The method as claimed in claim 1 wherein the coefficient block is formed by transforming from the raw image block of a luma component or a chroma component of the source image.

5. The method as claimed in claim 1 wherein the partition significance vector has a partition size of 4 bits.

6. A method of operation of an image processing system comprising:
   receiving a raw image block of a source image from an imaging device, the raw image block representing an array of 64×1 pixels;
   forming a coefficient block by performing a transform operation on the raw image block, the coefficient block having a target bit budget, a lowpass subband, a third highpass subband, a second highpass subband, and a first highpass subband, and the transform operation including a wavelet transform or a discrete cosine transform;
   calculating a coefficient significance vector for a current bitplane of the coefficient block, the coefficient significance vector having a significant value set at each index position having a non-zero value at a higher bitplane;
   calculating a partition significance vector for the current bitplane of the coefficient block, the partition significance vector having the significant value for each coefficient partition having a non-zero value;
   calculating a run-length coded value for a portion of the partition significance vector;
   calculating a Golomb coded value for a portion of a significant partition;
   forming an encoded block having the run-length coded value and the Golomb coded value; and
   forming a bitstream having an encoded block.

7. The method as claimed in claim 6 wherein the coefficient significance vector is calculated based on the current bitplane and a previous state of the coefficient significance vector.

8. The method as claimed in claim 6 wherein the Golomb coded value is calculated only when the available bit budget is above 10 bits and the current partition is in a highpass subband.

9. The method as claimed in claim 6 wherein the Golomb coded value is retrieved from a Golomb code table mapping the partition bit pattern of the current partition to the Golomb coded value.

10. The method as claimed in claim 6 wherein the raw image block is extracted from the source image in a non-sequential order.

11. An image processing system comprising:
   a pre-processing module for receiving a raw image block of a source image from an imaging device;
   a transform module, coupled to the pre-processing module, for forming a coefficient block by performing a transform operation on the raw image block, and the transform operation including a wavelet transform or a discrete cosine transform; and an encoding module, coupled to the transform module, wherein the encoding module is for:
- calculating a coefficient significance vector for a current bitplane of the coefficient block, the coefficient significance vector having a significant value set at each index position having a non-zero value at a higher bitplane,
- calculating a partition significance vector for the current bitplane of the coefficient block, the partition significance vector having the significant value for each coefficient partition having a non-zero value,
- calculating a run-length coded value for a portion of the partition significance vector,
- calculating a Golomb coded value for a portion of a significant partition, and
- forming an encoded block in an image bitstream, the encoded block having the run-length coded value and the Golomb coded value, and the encoded block.

12. The system as claimed in claim 11 wherein the transform module includes a wavelet coefficient of the lowpass subband of the coefficient block prioritized by multiplying by a scaling factor.

13. The system as claimed in claim 11 wherein the encoding module includes a Golomb code table optimized over a pre-determined image set.

14. The system as claimed in claim 11 wherein the encoding module includes the coefficient block formed by transforming from the raw image block of a luma component or a chroma component of the source image.

15. The system as claimed in claim 11 wherein the encoding module includes the partition significance vector having a partition size of 4 bits.

16. The system as claimed in claim 11 wherein the raw image block represents an array of 64×1 pixels, and the coefficient block includes a target bit budget, a lowpass subband, a third highpass subband, a second highpass subband, and a first highpass subband.

17. The system as claimed in claim 16 wherein the encoding module includes the coefficient significance vector calculated based on the current bitplane and a previous state of the coefficient significance vector.

18. The system as claimed in claim 16 wherein the encoding module includes the Golomb coded value calculated only when an available bit budget is above 10 bits and the current partition is in a highpass subband.

19. The system as claimed in claim 16 wherein the encoding module retrieves the Golomb coded value from a Golomb code table for mapping the partition bit pattern of the current partition to the Golomb coded value.

20. The system as claimed in claim 16 wherein the transform module includes the raw image block extracted from the source image in a non-sequential order.

* * * * *